United States Patent
Kempe et al.

(10) Patent No.: US 8,570,625 B2
(45) Date of Patent: Oct. 29, 2013

(54) DEVICE AND METHOD FOR GENERATING AN IMAGE OF AN OBJECT

(75) Inventors: Michael Kempe, Kunitz (DE); Ralf Wolleschensky, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 1194 days.

(21) Appl. No.: 12/088,557

(22) PCT Filed: Sep. 14, 2006

(86) PCT No.: PCT/EP2006/008946
§ 371 (c)(1), (2), (4) Date: Mar. 28, 2008

(87) PCT Pub. No.: WO2007/036305
PCT Pub. Date: Apr. 5, 2007

(65) Prior Publication Data
US 2008/0252945 A1 Oct. 16, 2008

(30) Foreign Application Priority Data
Sep. 29, 2005 (DE) .......................... 10 2005 046 755

(51) Int. Cl.
*H04N 1/46* (2006.01)
*H04N 1/04* (2006.01)
(52) U.S. Cl.
USPC .......................... 358/509; 358/474; 358/475
(58) Field of Classification Search
None
See application file for complete search history.

(56) References Cited

U.S. PATENT DOCUMENTS 6,376,818 B1 * 4/2002 Wilson et al. .............. 250/201.3
6,587,221 B1 * 7/2003 Young ........................... 358/1.2

FOREIGN PATENT DOCUMENTS

| DE | 101 18 463 A1 | 10/2002 |
| DE | 101 55 002 A1 | 5/2003 |
| DE | 102 54 139 A1 | 5/2004 |
| EP | 1 400 780 A1 | 3/2004 |
| JP | 2003084206 | 3/2003 |
| WO | WO 97/06509 | 2/1997 |
| WO | WO 98/45745 | 10/1998 |

OTHER PUBLICATIONS

Neil, M.A.A., et al.; Method of obtaining optical sectioning by using structured light in a conventional microscope; Optics Letters 1997; 22(24):1905-1907.

* cited by examiner

*Primary Examiner* — Thierry Pham
(74) *Attorney, Agent, or Firm* — Duane Morris LLP

(57) ABSTRACT

A device for generating an image of an object is provided, comprising an illumination module, by means of which the object can be illuminated with a pattern whose phase is altered temporally, a recording module, by means of which a plurality of recordings of the object are carried out during the phase change of the pattern, and a processing module, which generates the image from the recordings, wherein the illumination module moves a light beam over the object and modulates its intensity synchronously with the movement such that the beam generates the pattern in scanning fashion.

14 Claims, 1 Drawing Sheet

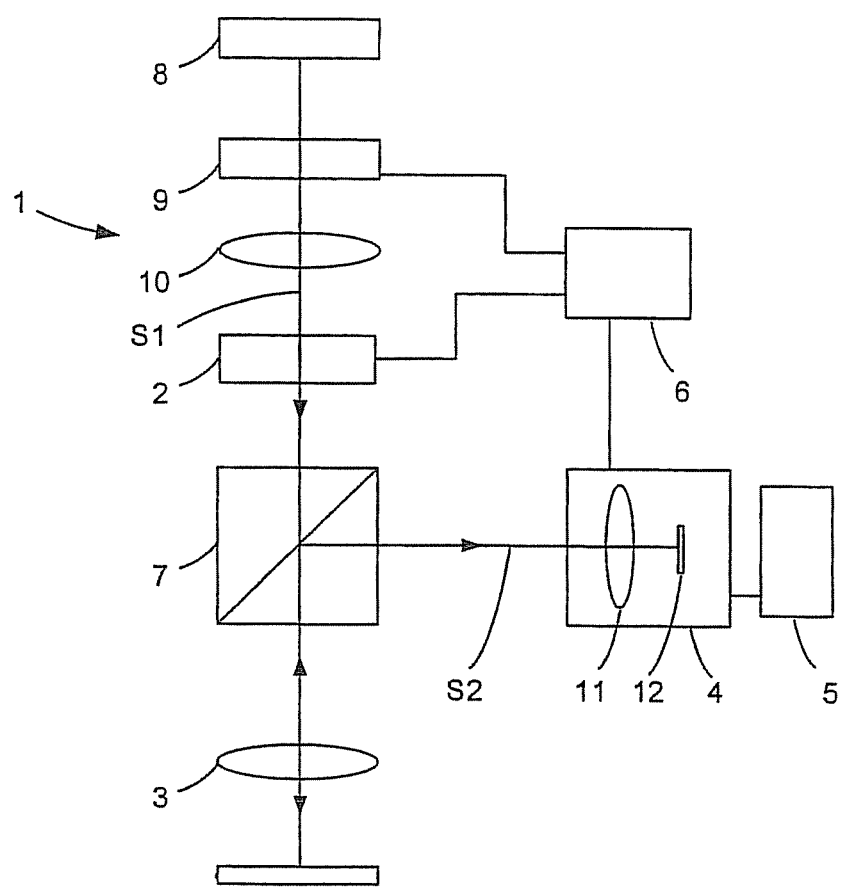

DEVICE AND METHOD FOR GENERATING AN IMAGE OF AN OBJECT

RELATED APPLICATIONS

The present application is a U.S. National Stage application of International PCT Application Number PCT/EP2006/008946 filed on Sep. 14, 2006, which claims the benefit of German Application Number DE 10 2005 046 755.5 filed on Sep. 29, 2005, the contents of each of which are incorporated by reference in their entirety.

FIELD OF THE INVENTION

The invention relates to a device for generating an image of an object, having an illumination module with which an object can be illuminated with a pattern, the phase of which is temporally changed, having an exposure module with which several exposures of the object can be executed during the phase change of the pattern, and having a processing module that produces the image from the exposures. In addition, the invention relates to a method for producing an image of an object having the steps of: illuminating the object with a pattern, the phase of which is temporally changed, repeated exposure of said object during the phase change and generating the image from the exposures. Such a device and method are frequently employed in laser microscopy.

BACKGROUND OF THE INVENTION

It is known that a structuring of the illumination can be employed in order to achieve confocal depth discrimination in wide angle or with partial illumination of the image field (e.g., linear illumination). By means of a phase shift of the structured illumination, a depth-discriminated optical section can then be calculated, thereby producing the desired image of the object. As described, for example, in M. A. A. Neil et al., "Method of obtaining optical sectioning by using structured light in a conventional microscope" Optics Letter 22(24) 1997, 1905-1907, this can be achieved with three phase images at 0°, 120° and 240°.

In order to structure the illumination, either grids in the illumination beam path, interference of coherent partial rays or the employment of diffractive optical elements are proposed. A disadvantage is the inflexibility caused, since, when changing the objective lens of a laser microscope, a change in the structuring is also generally required. As a rule, a different grid must be provided for this, the interference of coherent partial beams must be changed or a different diffractive optical element must be employed.

In order to achieve increased resolution, a structuring close to the limiting frequency of the illumination side of the objective lens is necessary. Frequently, this is achieved only with a low modulation depth and/or a low illumination-side efficiency.

In addition, the generally low illumination intensity (in particular the low efficiency on the illumination side for the aforementioned resolution increase) is disadvantageous, if nonlinear specimen change effects are to be achieved.

SUMMARY OF THE INVENTION

Starting from here, an object of the invention is to provide an improved device and method for generating an image of the aforementioned type such that the above disadvantages can be completely overcome as much as possible.

The problem is solved for a device of the aforementioned type in that the illumination module moves a light beam over the object and the intensity thereof is modulated, synchronously with the movement, in such a way that the beam produces the pattern by means of scanning.

A complete modulation (modulation depth of 1) always can be achieved independently of the frequency and illumination distribution predetermined by the pattern. In addition, the illumination intensity can be maximized independently of the pattern, which is of advantage, in particular, for nonlinear change effects. Maximization can be achieved, in particular, by carrying out a diffraction limited focusing. In this connection, it can be a matter, for example, of a punctiform or linear focus.

The pattern produced on or in the specimen can preferably be a periodic pattern (periodic intensity distribution). For this reason, it is particularly simple to calculate or produce an image of the object (thus, in particular, the desired depth-discriminated optical section) from the exposures.

The exposure module can feature a surface detector that, synchronous to the movement of the beam, detects, in a spatially resolved manner, the specimen radiation produced by means of the light beam (or, optical beam). Specimen radiation is a matter of the radiation, which, by means of the interaction of the light beam focused on or in the specimen and moved over the specimen, is produced with the specimen. In particular, this can be a matter of fluorescent light, reflected light, luminescent light, scattered and/or transmitted light.

The surface detector can be designed as a matrix or line detector.

The illumination module can change the phase in a temporal linear manner or also in a temporal periodic manner. In particular, a sinusoidal or cosinusoidal phase change can be executed as a periodic change.

For modulating intensity, the illumination module can feature an optical switch. In particular, an AOM (acousto-optic modulator) or EOM (electro-optic modulator) can be employed.

The device, moreover, can feature a control module, which controls the illumination module, exposure module and processing module such that illumination of the object is carried out in different depths in the object by means of a focusing of the beam in the depths and, in each case, more exposures being recorded in the different depths such that the processing module can produce images from different depths of the object. Naturally, the images from different depths also can be utilized to produce a three-dimensional representation.

The illumination module can produce several light beams, which, spaced from each other, are focused on the object and moved over the object wherein in this connection the intensity of the beams is changed synchronously with the movement in such a way that the beams produce the pattern by means of scanning. Through the employment of several beams spaced from each other the object can be illuminated temporally more quickly.

The device according to the invention for producing an image of an object is designed, in particular, as a microscope. The microscope can be a laser scanning microscope.

The problem is solved in addition by means of a method of the aforementioned, type for which, in the illumination step, a light beam, the intensity of which is temporally modulated, is moved over the object, with the movement and the intensity modulation of the light beam being able to be synchronized such that the beam produces the pattern by means of scanning.

This method always can be used to achieve a complete modulation (modulation depth of 1), independent of the form of the pattern. In addition, the illumination intensity can be maximized independent of the pattern. For example the beam can be focused in a diffraction-limited manner, in a punctiform or linear manner in particular. In particular, the pattern can be a periodic pattern.

In addition, the pattern can be changed quickly if this is necessary due to a replacement of an optical element (e.g., objective lens) of the illumination module.

In particular, in order to expose an object synchronously with the movement of the beam, the specimen radiation produced by said beam can be detected with spatial resolution. Conventional local resolution detectors can be employed for this purpose. In particular, line or surface detectors can be used.

The temporal change of the phase can occur, for example, in a linear or periodic manner. In particular, a cosinusoidal or sinusoidal temporal phase change can be executed.

The illumination step, exposure steps and production steps can be executed repeatedly, whereby, in the different illumination steps, focusing of the beam occurs in different depths of the specimen such that images can be produced from different depths of the specimen. Said images naturally also can be utilized in order to produce a three-dimensional image of the specimen.

In addition, with the method, several light beams the intensity of which can be temporally modulated can, spaced apart from each other, be focused on the object and moved together over the object, with the movement and the intensity modulation of the beams being synchronized such that the beams produce the pattern by means of scanning. Through the employment of several beams, the pattern can be produced more quickly, accelerating image production as a whole.

The method according to the invention for producing an image of an object is, in particular, a microscopy method. The microscopy method can be a laser scanning microscopy method.

Here, light beams are understood to be, in particular, light beams having a wavelength from the UV region up to the IR region (e.g., from the region of 300 nm-1.5 μm).

BRIEF DESCRIPTION OF THE DRAWING

The invention will be described, by way of example, in connection with the embodiment shown in FIG. 1.

DESCRIPTION OF THE PREFERRED EMBODIMENT

Referring to FIG. 1, the device is designed, in order to produce an image of an object, as a laser scanning microscope comprising a radiation-producing module (1), scanning module (2), objective lens (3), exposure module (4), processing module (5) and also a control module (6).

The radiation-producing module (1) produces a laser beam (S1) that is directed on the specimen by means of the scanning module (2) and a beam splitter (7) switched between the scanning module (2) and the objective lens (3) and by means of the objective lens (3), with the scanning module (2) causing the laser beam to sweep over the specimen.

The radiation-producing module (1) forms, together with the scanning module (2) and objective lens (3), an illumination module that focuses and sweeps the produced laser beam or laser beam bundle (S1) on or preferably in a predetermined depth of the specimen. The described embodiment executes a diffraction-limited punctiform focusing. The scanning module (2) sweeps the laser beam (S1) in two different directions in order to illuminate the specimen in a 2-dimensional manner. As will be explained, the radiation-producing module (1) produces an intensity-modulated laser beam (S1) synchronous with the sweep of the scanning module (2) in such a way that the focused laser beam (S1) produces, on or in the specimen, an illumination having a predetermined local intensity variation. A pattern is imaged on or in the specimen. Moreover, this brings about an additional further temporal phase change of the pattern.

In order to produce a laser beam (or light beam) (S1) modulated in this way, the radiation-producing module (1) comprises a laser (8), to which an optical switch (9) for intensity modulation and optics (10) for forming the beam are connected on the output side. The control module (6) controls the radiation-producing module (1) (here the optical switch (9) and scanning module (2)) in such a way that the desired illumination pattern is produced and the phase thereof (preferably periodic) is changed. The illumination pattern itself can, preferably, also be a local periodic pattern.

In a specimen illuminated in this way, the interaction of the modulated laser beam (S1) with the specimen causes specimen light (S2) to be produced that reaches the exposure module (4) via the objective lens (3) and beam splitter (7). Here, the exposure module comprises exposure optics (11) as well as a detector (12). Due to punctiform focusing, always only one point of the specimen is illuminated, the specimen light (S2) of which is received by means of the detector (12). The data produced in this way are supplied to the processing module (5), which, due to the different exposures with different phase positions, can calculate depth-discriminated sections.

Alternatively, the radiation-producing module (1) can be designed so as to produce a linear focus in the specimen. In this case, the scanning module (2) is designed in a way causing a sweep perpendicular to the extension direction of the linear focus, such that likewise the overall specimen is illuminated by means of scanning. In this case the detector (12) also must be at least a linear detector in order always to be able to detect, in a locally resolving manner, the specimen light from the linear section being illuminated at that moment.

Apart from the aforementioned exposure with different phase positions (e.g. 0°, 120° and 240°), it is also possible to spatially separate an in-phase portion of the specimen light (S2) and an out-of-phase portion of the specimen light (S2) in the exposure module (4) and to direct the two portions to two different detectors (e.g., locally resolving linear detectors). With a large number of changes of the illumination pattern, one also can calculate from these two in-phase and out-of-phase signals a depth discriminated optical section as is described exhaustively in DE 102 54 139 A1. The spatial separation of the in-phase and out-of-phase portion can be executed in the same way as described, in particular, in connection with illustration 4 of DE 102 54 139 A1.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modification as are suited to the particular use contemplated.

The invention claimed is:

1. A device for generating an image of an object, comprising an illumination module with which an object can be illuminated with a pattern, the phase of which is temporally changed;

an exposure module with which several exposures of said object can be executed during the phase change of the pattern; and a processing module that produces the image from the exposures;

wherein said illumination module moves a light beam over the object and focuses said light beam on the specimen in a punctiform or linear manner temporally modulates the intensity thereof synchronously with the movement thereby effecting spatial modulation of the intensity on the sample in such a way that the beam produces the pattern by means of scanning.

2. The device according to claim 1, wherein said illumination module focuses the beam on the specimen, particularly in a diffraction-limited manner.

3. The device according to claim 1, wherein said exposure module has a surface detector, which is used to detect, in a spatially resolved manner, synchronously with the movement of the beam, the specimen radiation produced by means of the beam.

4. The device according to claim 3, wherein said surface detector is a matrix or line detector.

5. The device according to claim 1, wherein said illumination module changes the phase in a temporally linear manner or periodic manner.

6. The device according to claim 1, wherein said illumination module has an optical switch for intensity modulation.

7. The device according to claim 1, further comprising a control module for controlling said illumination module, exposure module and processing module in such a way that illumination of the object occurs at different depths in the object by means of focusing the beam in the depths and, in each case, records several exposures in the different depths, such that the processing module can produce images from different depths of the object.

8. The device according to claim 1, wherein said illumination module produces several light beams, focuses on the object with these spaced from each other, and moves over the object and, in this connection, changes the intensity of the beams synchronously with the movement in such a way that the beams produce the pattern by means of scanning.

9. A method for generating an image of an object comprising: illuminating an object with a periodic pattern, the phase of which is temporally changed, repeatedly exposing the object during the phase change, and generating an image from the exposures, wherein in the illumination step a light beam, the intensity of which is temporally modulated, is moved over the object, with the movement and intensity modulation of the light beam being synchronized thereby effecting spatial modulation of the intensity on the sample in such a way that the beam produces the pattern by means of scanning, and wherein said beam is focused in a punctiform or linear manner.

10. The method according to claim 9, wherein said beam is focused in a diffraction-limited manner.

11. The method according to claim 9, wherein in order to expose the object synchronously with the movement of the beam, the specimen radiation produced by means of the beam is detected in a spatially resolved manner.

12. The method according to claim 9, wherein the temporal change of the phase occurs in a linear or periodic manner.

13. The method according to claim 9, wherein in the different illumination steps a focusing of the light beam occurs in different depths of the specimen such that images can be produced from the different depths of said specimen.

14. The method according to claim 9, wherein several light beams, the intensities of which are temporally modulated, are focused, spaced apart from each other, on the object and are moved together over said object, with the movement and intensity modulation of the light beams being synchronized in such a way that the beams produce a pattern by means of scanning.

* * * * *

UNITED STATES PATENT AND TRADEMARK OFFICE
CERTIFICATE OF CORRECTION

PATENT NO. : 8,570,625 B2
APPLICATION NO. : 12/088557
DATED : October 29, 2013
INVENTOR(S) : Michael Kempe and Ralf Wolleschensky Page 1 of 1

It is certified that error appears in the above-identified patent and that said Letters Patent is hereby corrected as shown below:

Title page, item (73) Assignee should read as follows: Carl Zeiss Microscopy GmbH, Jena (DE)

Signed and Sealed this
Twenty-fourth Day of December, 2013

Margaret A. Focarino
*Commissioner for Patents of the United States Patent and Trademark Office*